Patented Oct. 10, 1933

1,930,232

UNITED STATES PATENT OFFICE 1,930,232

COLORATION OF MATERIALS

George Holland Ellis, Tobias Ockman, and Henry Charles Olpin, Spondon, near Derby, England, assignors to Celanese Corporation of America, a corporation of Delaware No Drawing. Application May 1, 1930, Serial No. 449,082, and in Great Britain June 25, 1929

16 Claims. (Cl. 8—5)

This invention relates to the treatment of materials and especially of materials such as filaments, fibres, threads, fabrics or films made of or containing cellulose esters or ethers to obtain fast colorations.

In U. S. Patent No. 1,723,230 processes are described for increasing the fastness to light of colorations on materials containing cellulose acetate by treating the materials with one or more amino or substituted amino compounds, e. g. aniline, alkylated anilines or alkylated phenylene diamines.

Colorations such as dyeings, printings or stencillings produced with certain anthraquinone derivatives, and particularly those containing free amino, alkylamino or arylamino groups, whether or not such anthraquinone derivatives contain other nuclear substituents, lack fastness to the combined agencies of acid and light. In view of the fact that commercial treatments frequently entail subjecting the materials to acid treatments, this lack of fastness constitutes a serious drawback to the use of anthraquinone derivatives, and particularly those specified.

We have now found that alkylated amino diaryl bases, that is to say bases containing one or more alkylated amino groups and two aryl residues, are particularly valuable in improving fastness and especially the fastness of the said anthraquinone derivatives. Bases which contain two benzene residues and two or more dialkyl amino groups, e. g. tetralkyl diamino compounds, appear to give the best results.

Accordingly the present invention comprises broadly a process for the treatment of materials by incorporating therein one or more of the above substances before, after or together with the coloration thereof. As examples of suitable compounds the following may be instanced:— tetramethyl or other tetralkylated diaminodiphenyl methanes, tetramethyl or other tetralkylated diaminodiphenyl ethanes, tetralkylated benzidines or dianisidines.

Other substances capable of improving the fastness, for instance the ureas, thioureas and guanidines of British application No. 19499/29 filed 25th June, 1929 and corresponding U. S. No. 450,308 filed May 6, 1930 and/or inorganic compounds having an alkaline reaction, that is to say substances which are alkaline and contain an inorganic base, for example sodium carbonate, borax, disodium hydrogen phosphate, sodium acetate, sodium palmitate or potassium oleate, may be applied to the materials in addition to and separately from or simultaneously with the alkylated amino diaryl bases. Most conveniently the inorganic substances are applied either during dyeing or otherwise coloring, or during a finishing or other after treatment. In the treatment of materials made of or containing cellulose esters such inorganic substances are preferably not sufficiently basic or alkaline, or are not applied in sufficient concentration, to produce a deleterious degree of hydrolysis of the cellulose ester.

The alkylated amino diaryl bases may be applied in any suitable manner. For example in the treatment of materials containing cellulose esters or ethers they may be absorbed from aqueous solutions of their salts, for example their hydrochlorides. Alternatively they may be applied in the form of aqueous dispersions produced in any suitable manner, for instance by the methods described in prior U. S. Applications Serial Nos. 152,517 filed 3rd December, 1926, 134,138 filed 7th September, 1926, 390,423 filed 4th September, 1929, 390,424 filed 4th September, 1929, U. S. Patents Nos. 1,618,413, 1,618,414, 1,694,413, 1,690,481 and 1,716,721. The preparations containing the alkylated amino diaryl bases with dispersing agents and/or protective colloids form an important part of the present invention. The preparations may be in solid, powdered, paste or more or less concentrated liquid form. Again, where possible, the alkylated amino diaryl bases may be applied in true solution. From the point of view of ease of application, the invention particularly contemplates the use of bases having a substantive affinity for the materials under treatment. A treatment of the materials with solutions or dispersions containing up to 2%, e. g. 0.2–1%, of the bases gives very much improved fastness.

Compositions of matter may be made up containing the alkylated amino diaryl bases together with the coloring matters, and particularly the coloring matters of the anthraquinone series containing free amino, alkylamino or arylamino groups. Such compositions, which preferably contain the alkylated amino diaryl base and the dyestuff in dispersed form, produced for example by means of any of the dispersing agents mentioned in the prior U. S. specifications referred to, also form part of the present invention. They may be applied directly for the coloration of the materials in fast shades.

A further method of incorporating the alkylated amino diaryl bases in artificial materials, and particularly artificial materials made of or containing cellulose acetate or other cellulose esters or ethers, consists in dissolving or otherwise incorporating the alkylated amino diaryl bases in the spinning solutions used for the manufacture of the materials. Thus for example an acetone solution of cellulose acetate containing up to 2% of tetramethyldiamino-diphenylmethane or other alkylated amino diaryl base (on the weight of the cellulose acetate) may be spun according to dry spinning methods to produce cellulose acetate filaments or yarns which are capable of being directly dyed in fast shades with the anthraquinone dyestuffs.

As already indicated the invention is of particular value in rendering fast, to the combined agencies of light and acid, colorations produced with anthraquinone derivatives, and especially those containing free amino, alkylamino or arylamino groups. For this reason the process is most valuable in connection with the treatment of materials made of cellulose acetate or other cellulose esters or ethers, for instance cellulose formate, cellulose propionate, cellulose butyrate or methyl, ethyl or benzyl cellulose, or materials containing such cellulose derivatives associated with other fibres, such as wool, cotton or silk. The invention may however be applied to the treatment of materials consisting wholly of wool or silk or other fibres.

The following examples illustrate the best methods known to us for carrying the invention into effect but they are not to be considered as limiting the invention in any way:—

Example 1

10 lbs. of a 10% aqueous paste of 1-methylamino-4-amino-anthraquinone are mixed with 3 lbs. of 50% Turkey red oil, diluted with boiling soft water, and added through a filter cloth to a dyebath containing 300 gallons of warm soft water. ½ lb. of tetramethyldiaminodiphenylmethane is dispersed by warming with 5 lbs. of 50% Turkey red oil, and diluted cautiously with 10 gallons of hot water with stirring, to obtain a clear dispersion, which is also added to the dyebath. 100 lbs. of cellulose acetate knitted fabric, previously scoured, are now entered, and dyeing effected by raising the temperature of the dyebath to 75–80° C. and maintaining it thereabouts for 1½ hours. The goods, which have absorbed both dyestuff and protective agent, are now lifted, rinsed, and dried or otherwise treated as requisite.

Example 2

1 lb. of tetraethyldiaminodiphenylethane is dispersed by warming with 10 lbs. of 50% Turkey red oil, diluting cautiously with 10 gallons of hot soft water, and added to a bath containing 300 gallons of hot soft water. 100 lbs. of cellulose acetate knitted fabric, previously dyed with 1 lb. of 1:4:5:8 tetraminoanthraquinone, are now entered, and treated at 75–80° C. for 1½ hours. The goods are now lifted, rinsed, and dried or otherwise treated as requisite.

Example 3

1 lb. of tetramethylbenzidine is dissolved in water to which the least quantity of hydrochloric acid, sufficient to effect complete solution, has been added. The solution is diluted with 300 gallons of water in a suitable vessel, and 100 lbs. of cellulose acetate woven fabric, previously dyed with 1 lb. of diaminochrysazin, entered. Treatment is continued for 1½ hours at 75–80° C. the calculated quantity of sodium salt being added slowly during this time to neutralize mineral acidity, and assist exhaustion. The goods are now lifted, washed till acid free, passed through a solution containing ½ gram per litre of borax, hydroextracted, and dried without rinsing.

What we claim and desire to secure by Letters Patent is:—

1. Process for improving the fastness of colorations on materials, comprising incorporating in the materials at any stage of their manufacture an alkylated amino-diaryl base having no coloring action on the material.

2. Process for improving the fastness on materials of colorations produced with anthraquinone derivatives containing at least one substituent group of the type

where $R_1$ and $R_2$ represent hydrogen or alkyl groups, comprising incorporating in the materials at any stage of their manufacture an alkylated amino-diaryl base having no coloring action on the material.

3. Process for improving the fastness on materials containing organic derivatives of cellulose of colorations produced with anthraquinone derivatives containing at least one substituent group of the type

where $R_1$ and $R_2$ represent hydrogen or alkyl groups, comprising incorporating in the materials at any stage of their manufacture an alkylated amino-diaryl base having no coloring action on the material.

4. Process for improving the fastness on materials containing cellulose acetate of colorations produced with anthraquinone derivatives containing at least one substituent group of the type

where $R_1$ and $R_2$ represent hydrogen or alkyl groups, comprising incorporating in the materials at any stage of their manufacture an alkylated amino-diaryl base having no coloration action on the material.

5. Process according to claim 4, in which the alkylated amino-diaryl base is an N.-tetra-alkyl derivative of a compound having the formula $C_nH_{2n}(C_6H_4NH_2)_2$ where $n=1$ or 2.

6. Process for improving the fastness on materials containing cellulose acetate of colorations produced with anthraquinone derivatives containing at least one substituent group of the type

where $R_1$ and $R_2$ represent hydrogen or alkyl groups, comprising incorporating in the materials at any stage of their manufacture an alkylated amino-diaryl base having no coloring action on the material in a proportion up to 2% of the weight of the material.

7. Materials colored with anthraquinone derivatives containing at least one substituent group of the type

where $R_1$ and $R_2$ are hydrogen or alkyl groups, and containing an alkylated amino-diaryl base having no coloring action on the material.

8. Materials containing organic derivatives of cellulose colored with anthraquinone derivatives containing at least one substituent group of the type

where $R_1$ and $R_2$ are hydrogen or alkyl groups, and containing an alkylated amino-diaryl base having no coloring action on the material.

9. Materials containing cellulose acetate colored with anthraquinone derivatives containing at least one substituent group of the type

where $R_1$ and $R_2$ are hydrogen or alkyl groups, and containing an alkylated amino-diaryl base having no coloring action on the material.

10. Materials containing cellulose acetate colored with anthraquinone derivatives containing at least one substituent group of the type

where $R_1$ and $R_2$ are hydrogen or alkyl groups, and containing an alkylated amino-diaryl base having no coloring action on the material in a proportion up to 2% of the weight of the material.

11. Materials according to claim 10, in which the alkylated amino-diaryl base is an N.-tetra-alkyl derivative of a compound having the formula $C_nH_{2n}(C_6H_4NH_2)_2$ where $n=1$ or 2.

12. A composition of matter containing an insoluble dyestuff, an alkylated amino-diaryl base having no coloring properties, and a substance capable of assisting the formation of a dispersion of the said dyestuff.

13. A composition of matter containing an insoluble dyestuff, an alkylated amino-diaryl base having no coloring properties, and a dispersing agent.

14. A composition of matter according to claim 13, in which the insoluble dyestuff is an anthraquinone derivative containing at least one substituent group of the type.

where $R_1$ and $R_2$ are hydrogen or alkyl groups.

15. A composition of matter according to claim 13, in which the alkylated amino diaryl base is an N.-tetra-alkyl derivative of a compound having the formula $C_nH_{2n}(C_6H_4NH_2)_2$, where $n=1$ or 2.

16. Textile materials colored with dyestuffs normally having poor fastness to the combined agencies of acid and light and containing an alkylated amino-diaryl base having no coloring action on the material.

GEORGE HOLLAND ELLIS.
TOBIAS OCKMAN.
HENRY CHARLES OLPIN.